United States Patent [19]

McCabe

[11] 4,200,954
[45] May 6, 1980

[54] TELESCOPING HEAT RESPONSIVE RELEASING MEANS

[76] Inventor: Francis J. McCabe, 239 Hastings Ct., Doylestown, Pa. 18901

[21] Appl. No.: 864,579

[22] Filed: Dec. 27, 1977

Related U.S. Application Data

[63] Continuation-in-part of Ser. No. 676,413, Apr. 13, 1976, Pat. No. 4,040,304, and Ser. No. 779,044, Mar. 18, 1977, Pat. No. 4,099,292, which is a continuation-in-part of Ser. No. 676,483, Apr. 13, 1976, Pat. No. 4,041,570.

[51] Int. Cl.$^2$ .............................................. E05F 15/20
[52] U.S. Cl. ...................................... 16/48.5; 49/2; 292/DIG. 66; 307/117
[58] Field of Search ............... 16/48.5, 49, 78, 85, 16/DIG. 10, DIG. 14; 49/1, 2, 7, 8, 31, 279, 329; 160/1, 2, 5, 6, 7, 8; 307/66, 126, 130, 117; 292/DIG. 66

[56] References Cited

U.S. PATENT DOCUMENTS

| | | | |
|---|---|---|---|
| 3,725,972 | 4/1973 | McCabe | 16/48.5 |
| 3,771,195 | 11/1973 | Tansley | 16/48.5 |
| 3,795,818 | 3/1974 | Beaman et al. | 307/66 |
| 3,889,314 | 6/1975 | McCabe | 16/48.5 |
| 3,968,417 | 7/1976 | Dials | 307/66 X |
| 4,041,570 | 8/1977 | McCabe | 16/48.5 |
| 4,074,388 | 2/1978 | McCabe | 16/48.5 |

*Primary Examiner*—C. J. Husar
*Assistant Examiner*—Moshe I. Cohen
*Attorney, Agent, or Firm*—Benasutti Associates, Ltd.

[57] ABSTRACT

A novel telescoping heat responsive releasing device is described wherein a mounting member on which a bimetallic means is mounted slidingly engages a pawl member which is movable between a first position in which the pawl member is capable of being restained by the aforementioned bimetallic means, and an actuating position wherein associated apparatus connected to said releasing device may assume the desired heat responsive posture. Various alternate embodiments are illustrated wherein a plurality of bimetallic elements are utilized to engage the pawl member, wherein a bimetallic element is additionally actuated mechanically or electrically, and wherein various pawl and mounting member configurations are illustrated.

10 Claims, 12 Drawing Figures

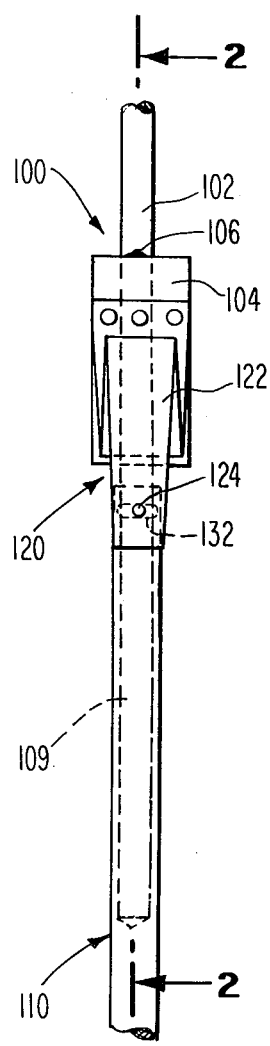
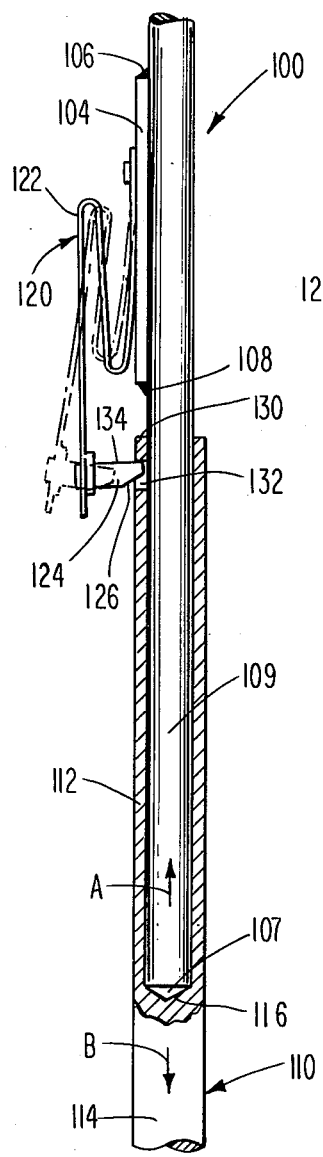
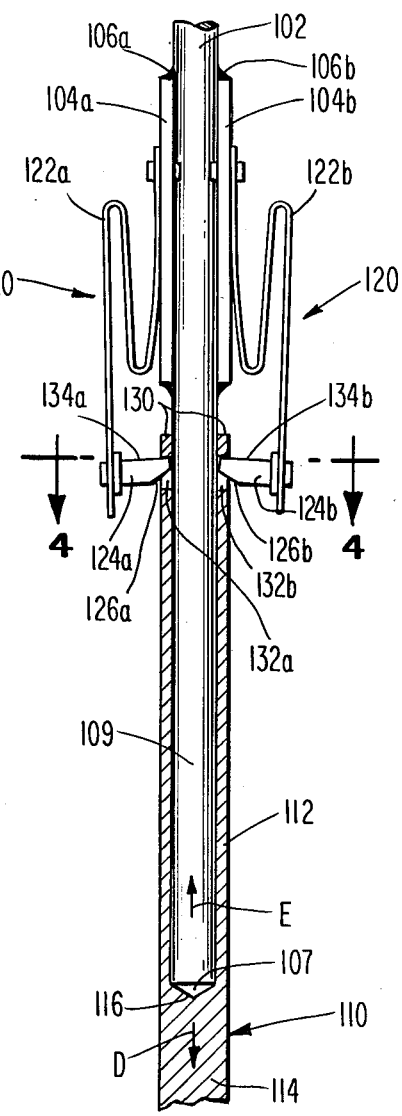
Fig. 1  Fig. 2  Fig. 3
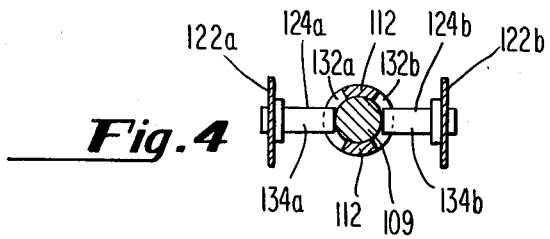
Fig. 4

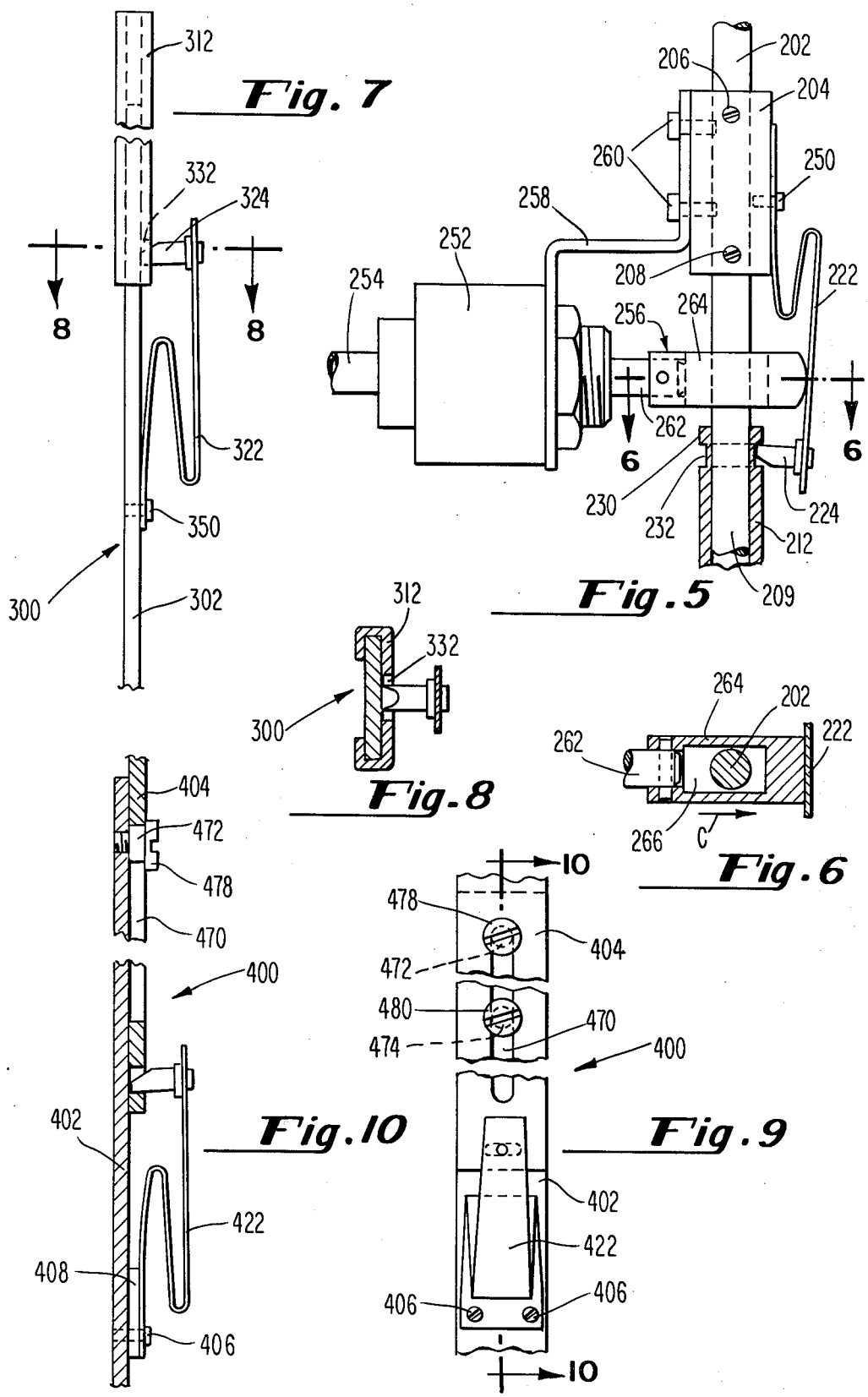

TELESCOPING HEAT RESPONSIVE RELEASING MEANS

CROSS-REFERENCE TO RELATED APPLICATIONS

The present application is a continuation-in-part of my prior co-pending patent application entitled "Telescoping Heat Responsive Releasing Means", U.S. Ser. No. 779,044, filed Mar. 18, 1977 now U.S. Pat. No. 4,099,292 which in turn is a continuation-in-part of my prior co-pending patent application entitled, "Resettable, Heat Activatable Fire Link", Ser. No. 676,483, filed Apr. 13, 1976, now U.S. Pat. No. 4,041,570; as well as, a continuation-in-part of my prior co-pending patent application entitled "Clutch Motor for Use in Resettable Fire Damper", Ser. No. 676,413, filed Apr. 13, 1976, now U.S. Pat. No. 4,040,304 which applications are incorporated herein by reference as if fully set forth herein.

The present application is also related to my co-pending patent application entitled, "Smoke, Fire And/Or Volume Control Damper", Ser. No. 771,473, filed Feb. 24, 1977, now U.S. Pat. No. 4,089,978 which application is also specifically incorporated herein by reference.

BACKGROUND OF THE INVENTION

The present invention generally relates to releasing devices, and more particularly, releasing devices employing bimetals, which releasing devices are conventionally useful to actuate various fire protection equipment in response to increases in heat in the vicinity of the device.

Conventionally, fusible or meltable releasing devices have been employed, such as fusible links in cables which are held under tension in normal conditions and which are actuated by the melting of the link and the resulting break of the cable.

More recently, bimetallic links, such as those illustrated in my previously issued U.S. Pat. Nos. 3,889,314 entitled, "Heat Actuated Link", and 3,725,972 entitled, "Fire Link and Method of Actuating Same", have been described wherein a mounting element having a bimetallic strip attached thereto, which cooperates therewith, may engage a pawl having an aperture therein which is engaged by the bimetallic element in the normal position and which is released thereby as the tip of the bimetallic element separates from the mounting or striker portion thereof to release the pawl. These bimetallic links have conventionally been installed by attaching a cable to either the pawl, the mounting element, or both in a manner similar to that used for the fusible or meltable links described above. These bimetallic links have exhibited certain advantages over the prior art fusible links in that following a return to normal temperatures, the link may be reset simply by reinserting the pawl into the remaining link assembly.

Unfortunately, prior art devices of the type described above have required that access be provided to the link device so that manual resetting is possible. In certain installations, such as in smoke tunnels, ducts, plenums, etc., human access to reset or replace releasing devices is limited. Additionally, relatively skilled personnel must be employed in order to reset or replace the aforementioned releasing devices. In the case of the bimetallic links, these people must as least understand the proper method of inserting the pawl so that is is properly gripped by the remaining portion of the link.

For one approach to this problem, please refer to my previously issued United States patent entitled, "Remotely Resettable Fire Damper", U.S. Pat. No. 3,796,248, dated Mar. 12, 1974.

In addition to the desirability of having fire links which are remotely actuatable and resettable, it is desirable to provide a resettable fire actuatable releasing device which is responsive to power failures.

SUMMARY OF THE INVENTION

The present invention is basically an improvement over the devices illustrated in my previously issued U.S. Pat. No. 3,889,314 entitled, "Heat Actuated Link"; U.S. Pat. No. 3,725,972 entitled, "Fire Link and Method of Actuating Same"; and U.S. Pat. No. 3,796,248 entitled "Remotely Resettable Fire Damper".

Basically, the present invention comprises a telescoping heat responsive releasing device wherein two members are provided which slide with respect to each other between normal and actuated positions. A bimetallic means is mounted on one of said members to respond at least to the ambient temperature therearound, which bimetallic means is adapted to restrain said members relative to each other in the normal or restrained position under normal temperatures, and to release the members in response at least to a predetermined increase in the ambient temperature therearound, whereby the members are allowed to slide in the activated position. Since sliding engagement between the two members is maintained, resetting of the device may be accomplished when normal temperatures are restored merely by relatively sliding the two members back into the normal position, whereupon latching means provided as part of the bimetallic means is adapted to automatically receive and again restrain the members relative to each other.

An improved heat responsive releasing device is also disclosed which comprises a remotely controlled electric heating means connected to the bimetallic means for heating it. Under normal circumstances, the electric current is supplied to the heating means when required from a primary power source such as a conventional 120/240 electrical service. However, when the primary power source fails, e.g. during an electrical power failure either locally or regionally, it is sometimes desirable to activate the heat responsive releasing device to avoid being without the protection that these devices provide. In a preferred embodiment of the heat responsive releasing device, applicant has disclosed a means for activating the heat responsive releasing device during failure of the primary power source by including a secondary power means for automatically delivering electric current to the heating means when the primary power source fails.

By way of example, the present invention is adapted for use in such installations as fire doors which are weighted or sprung to move towards their closed positions, but which are preferably normally restrained in the open position by a releasing device. In response to excessive heat or a remote signal, the preferred embodiment of the present invention which is fixedly attached at one end to a stationary mount and at the other end to the fire door, will release the two movable members thereof to allow the weight or other closure mechanism to move the door to the closed position. Even if the door is reopened in the presence of excessive heat or while a remote activating signal is maintained to the bimetallic means, the device will not reset even if the movable members are caused to slide to the normal or restrained position. Once normal temperature (or signal) conditions are re-established, however, the device will automatically reset merely by reopening the fire door at which time the bimetallic means will have assumed a position adapted to re-engage and restrain the two slidable members with respect to each other in the normal position.

Accordingly, the primary object of the present invention is the provision of a telescoping heat responsive releasing device which will reset once normal temperatures (and normal signal conditions) are restored and the various sliding members thereof are recycled through their relative normal (restrained) position.

Another object of the present invention is the provision of an inexpensive fail safe heat responsive releasing device which may be reset by relatively inexperienced personnel.

A further object of the present invention is the provision of a heat responsive releasing device with the above described features which is additionally mechanically or electrically activatable from remote locations while at all times retaining the ability to respond to local conditions of excessive heat.

Another object of the present invention is the provision of a heat responsive releasing device which is electrically activatable from remote locations and additionally responsive to power failures.

These and other objects of the present invention will become more apparent from the following more detailed description.

BRIEF DESCRIPTION OF THE DRAWINGS

FIG. 1 is a foreshortened top view of a first preferred embodiment of the present invention wherein the mounting member is a rod, the pawl member a tube, and the bimetal a serpentine bimetal;

FIG. 2 is an enlarged cross-section taken as indicated by the lines and arrows 2—2 on FIG. 1 of the first preferred embodiment illustrated in FIG. 1 showing the pawl member and mounting member in the restrained position engaged by the bimetallic means, said means being shown in the released position in phantom in FIG. 2;

FIG. 3 is an enlarged cross-section similar to the view shown in FIG. 2 but for a second preferred embodiment of the present invention wherein the bimetallic means comprises two serpentine bimetallic elements and pins which are adapted to mate with apertures formed on generally opposing sides of the pawl members;

FIG. 4 is a cross-section of the preferred embodiment illustrated in FIG. 3 taken as indicated by the lines and arrows 4—4 in FIG. 3;

FIG. 5 is a foreshortened side view of a third preferred embodiment of the present invention wherein the bimetallic means further comprises an actuator for additionally actuating the release of the pawl and mounting members for relative slidable movement, this preferred embodiment also illustrating a relatively higher activation temperature serpentine bimetal and a pawl member having an annular groove formed therein to coact with the bimetal pin;

FIG. 6 is a cross-section of a portion of the apparatus illustrated in FIG. 5 taken as indicated by the lines and arrows 6—6 in FIG. 5 showing the disposition of the mounting member extending through an aperture formed in the actuating member, the direction of travel of the actuating member during activation being illustrated by arrow C;

FIG. 7 is a foreshortened side view of a fourth preferred embodiment of the present invention wherein the mounting member is bar-shaped and the pawl member generally channel-shaped;

FIG. 8 is a cross-section of the embodiment illustrated in FIG. 7 taken as indicated by the lines and arrows 8—8 in FIG. 7;

FIG. 9 is a foreshortened top view of a fifth preferred embodiment of the present invention wherein the pawl member and mounting member are both bar-shaped members and wherein the tracking means comprises a slot having a plurality of screws disposed to track therein;

FIG. 10 is a foreshortened enlarged side view of the preferred embodiment illustrated in FIG. 9 taken as indicated by the lines and arrows 10—10 in FIG. 9;

DETAILED DESCRIPTION OF THE DRAWINGS

Figure 11:
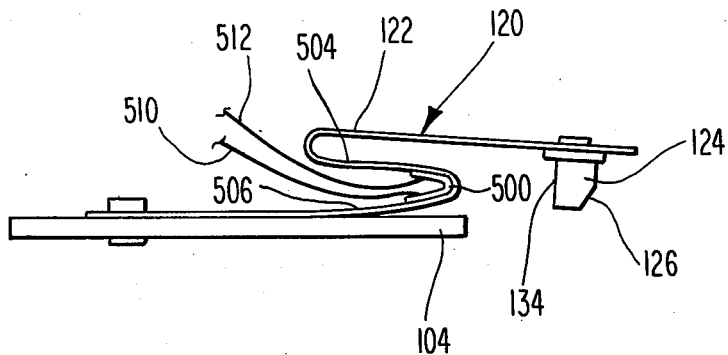
FIG. 11 is an enlarged side view of a portion of the mounting member and bimetallic means of FIG. 2 shows with a remotely controlled heating pad.

Although specific forms of the invention have been selected for illustration in the drawings, and the following description is drawn in specific terms for the purpose of describing these forms of the invention, this description is not intended to limit the scope of the invention which is defined in the appended claims.

The telescoping heat responsive releasing device of the present invention generally comprises a mounting member, a pawl member slidably engaging the mounting member, and bimetallic means mounted on said mounting member for restraining said pawl member relative to said mounting member in response to a preselected normal ambient temperature and for releasing said pawl member in response to at least a preselected increase in said ambient temperature, whereby said pawl member and said mounting member may slide relative to each other in response to said releasing action. In each of the preferred embodiments described hereinafter, at least a portion of the mounting member comprises a bearing surface which is complementally configured to an opposing bearing surface on that portion of the pawl member slidingly engaged by said mounting member portion. Accordingly, the pawl member tracks relatively along the mounting member between at least restrained and activated positions defined along said mounting member. In each preferred embodiment, the device will not reset, that is, the ability of the mounting and pawl members to slide relative to each other will not be interfered with at least between the restrained and activated positions as long as increased temperatures or other activation of the bimetallic means continues. Once normal ambient temperature or signal conditions are restored, however, upon the recycling of the pawl member with respect to the mounting member at least through the restrained position, various means are provided to insure the automatic resetting of the device to re-establish the relatively fixed relationship between the two members pending the next activation thereof. In various of the preferred embodiments to be described more fully hereinafter, various means are provided to prevent the relative sliding movement of the pawl and mounting members in at least a first direction beyond the restrained position, which means further insures that the above-described automatic resetting will occur. In other alternative embodiments, means are also provided to insure that the mounting and pawl members will not slide in the opposite direction beyond the actuated position in those embodiments where such means is not provided, it is contemplated that the associated peripheral equipment utilized in connection with the preferred embodiment will limit the travel of the mounting and pawl members relative to each other so that the sliding engagement thereof will, at all times, be maintained.

Although not specifically illustrated in the drawings, it is within the scope of the present invention to provide a means for biasing the mounting and pawl members generally away from said restrained position toward said activated position, so that peripheral means need not be required in order to accomplish the sliding movement of these members relative to each other upon the activation of the device in response to excessive heat (or otherwise). For example, referring to the embodiment shown in FIGS. 1 and 2, it is comtemplated that a spring may be disposed between the tip 107 and terminus 116 of tube portion 12 so that upon movement of the bimetallic means to the position shown in phantom in FIG. 2, the aforementioned biasing means will cause the movement of the mounting and pawl members in the directions illustrated by arrows A and B in FIG. 2.

Referring now to the drawings, and more particularly to FIGS. 1 and 2 of the drawings, the first preferred embodiment releasing device is illustrated. In this embodiment, the mounting member comprises a substantially cylindrical rod 102 and a substantially planar bimetal mounting plate 104 which is attached thereto by welds 106 and 108. The remote end of the rod 102 is shown broken away and when installed would preferably be mounted to an appropriate portion of the associated fire protection equipment with which the releasing device would be used. In each of the embodiments illustrated, the remote ends of the pawl and mounting members may be suitably shaped in order to engage and coact with the particular fire protection apparatus with which it is to be used. In FIG. 1, the pawl member may be seen to comprise a substantially cylindrical member designated generally 110 having a tube portion 112 defined in one end thereof and a solid portion 114 defined at the other end thereof. Accordingly, in this embodiment, the outer surface of the remote end 109 of rod 112 forms the bearing surface of the mounting member while the interior surface of the tube portion 112 of the cylindrical member 110 forms the complementally configured bearing surface of the pawl member. The fact that the cylindrical member 110 is bored to form tube portion 112 only up to a certain pre-defined depth creates a stop between the top 107 of rod 102 and the terminus 116 of tube portion 112. The mounting and pawl members of the first preferred embodiment are illustrated in FIG. 2 in the normal position thereof with respect to each other.

In the preferred embodiment illustrated in FIGS. 1 and 2, the bimetallic means designated generally 120 comprises a serpentine bimetallic link 122 and a latching means for at least receiving and engaging at least a portion of the pawl member when the pawl is moved relatively away from the activated position into said restrained position when the serpentine bimetal is in the dark link position shown in FIG. 2. This latching means in the embodiment illustrated in FIGS. 1 and 2 comprises a pin 124 extending substantially perpendicularly away from the tip of bimetal 122 and having a beveled surface 126 thereon which rides up over the leading edge 130 of tube portion 112 as the device is being reset. When the device reaches the position shown in FIGS. 1 and 2, the pin 124 snaps into aperture 132 defined in tube portion 112 and pin surface 134 which generally opposes the beveled surface 126 of the pin 124 interferes with the adjacent aperture surface of aperture 132 to prevent rod 102 and cylindrical member 110 from moving in the direction illustrated by arrows A and B in FIG. 2.

For the embodiment shown in FIG. 2, the serpentine bimetal 122 is heat responsive, that is, the bimetal responds to preselected increases in the ambient temperature surrounding the bimetal, which cause the bimetal to assume the position shown in phanton in FIG. 2 which thereby withdraws pin 124 from aperture 132 to release rod 102 from cylindrical member 110 to allow the relative sliding movement of these members in the direction indicated by arrows A and B in FIG. 2.

Referring now in particular to FIGS. 3 and 4, a second alternate embodiment of the present invention is illustrated wherein a plurality of bimetals 122a and 122b are illustrated engaging a plurality of apertures 132a and 132b respectively. As seen in FIGS. 3 and 4, the various elements of this embodiment are numbered with the same reference numbers as used for the embodiment of FIGS. 1 and 2, with the exception that those elements which have been duplicated by reason by the use of two bimetals, etc. have been numbered with additional letters "a" and "b" following the reference numbers for purposes of clarity. In this embodiment, it may be seen that the strength with which the movement of rod 102 and cylindrical member 110 in the direction illustrated by arrows E and D respectively is restrained will be far greater due to the use of a plurality of bimetals 122a and 122b, and plurality of pins 124a and 124b which engage a plurality of apertures 132a and 132b. The automatic resetting function of the device illustrated in FIGS. 3 and 4 will be similar to that illustrated in FIGS. 1 and 2 in that the beveled surfaces 126a and 126b of the pins will simultaneously ride over leading edge 130 of tube 112, then over the intermediate surface between that leading edge and apertures 132a and 132b, whereupon the pins will snap into the apertures to create the appropriate interference between surfaces 134a and 134b of the pins and the adjacent aperture surfaces.

Referring now to FIG. 5, a third alternate embodiment is illustrated wherein the mounting member generally comprises rod 202, and mounting bracket 204 which is screwed into rod 202 by screws 206 and 208. Only a portion of the tube portion 212 of the pawl member is illustrated which coacts with the remote end 209 of rod 202 in a manner similar to that described above, that is, the interior surface of tube portion 112 is a complementally configured bearing surface to the bearing surface presented by the outer surface of rod portion 209 to create a sliding relationship therebetween. In this embodiment, the function of the apertures described in connection with the previous embodiments is preformed by a substantially annular boss 230 and annular groove 232 which suitably replace the apertures described above with the additional advantage that the alignment of the pin 224 and bimetal 222 to which it is attached is no longer important. That is to say, in this embodiment the tube portion 212 may be allowed to freely rotate around the axis of rod 202 while nonetheless insuring that when the tube portion is moved into the position shown in FIG. 5, the beveled surface of the pin 224 will slide over boss 230 and snap into channel 232 regardless of the particular rotational orientation of tube portion 212. As with the previous embodiment described above, bimetal 222 is fixedly attached at the end thereof remote from pin 224 by means of a rivet 250 or other fastening means. The bimetal 222 illustrated in FIG. 5 is a relatively higher temperature bimetal than that illustrated in the previously described figures. In the embodiment illustrated in FIGS. 5 and 6, the bimetallic means further comprises actuator means for additionally releasing the pawl member in response to a remote signal received thereby. This actuator means comprises an actuator 252, signal transmission means 254 for relaying activating information from a remote source, and an actuating member designated generally 256. The actuator means is suitably mounted on the mounting element 202 by bracket 258 which is attached to mounting bracket 204 by means of rivets 260 or other fastening means. The actuator 252 may be a pneumatic or hydraulic cylinder in which case the signal transmission means 254 is a pneumatic or hydraulic line attached thereto. Alternatively the actuator 252 may be a solenoid in which case the signal transmission means 254 is a wire. The actuating member designated generally 256 comprises a cylinder rod 262 and plunger 264, which plunger has defined therein an aperture 266 which is sufficiently wide to allow rod 202 to extend therethrough and sufficiently long so that the full travel of actuating rod 262 in response to the activation of actuator 252 may be accommodated. Accordingly, referring to FIG. 6 it will be seen that as actuating rod 262 and plunger 264 are moved in the direction of arrow C in FIG. 6 to disengage pin 224 by means of moving its associated bimetal 222 in the direction of arrow C, rod 202 will move relatively to the left within plunger aperture 266. As a result of the mounting of the actuating means and bimetal on substantially opposing sides of rod 202, and further by allowing rod 202 to extend through the plunger aperture 266, the relative alignment of these various elements is substantially assured, that is to say, rod 202 being disposed within the plunger aperture 266 will additionally act to align the stroke of plunger 264 in the direction of arrow C to insure a positive withdraw of pin 224 from annular groove 232.

Referring now to the fourth perferred embodiment illustrated in FIGS. 7 and 8, it will be seen that the particular geometric configuration of the mounting member and pawl member may be altered, providing the required sliding engagement therebetween is suitably maintained. In the fourth preferred embodiment designated generally 300, the mounting member may simply comprise a mounting bar 302. The bimetallic means comprises bimetal 322 directly riveted to mounting bar 302 by rivets 350, said bimetallic means further comprises a pin 324 having a configuration similar to that described above. The bearing surface of the mounting member in this embodiment comprises the entirety of one of the flat surfaces thereof, the two edge surfaces thereof, and two peripheral portions of the other flat surface thereof. In this embodiment, the pawl member comprises a channel 312, the interior surfaces of which are complementally configured to the aforementioned bearing surfaces of the mounting member to slide therealong. An aperture 332 is appropriately located in one of the surfaces of the pawl member and is adapted to receive pin 324, in the restrained position in response to normal temperatures.

Although each of the embodiments illustrated in the drawings comprise pins having beveled surfaces therein so that the pin is lifted away from the pawl member when the leading edge of the pawl member engages the beveled surface during the resetting of the device, it is also within the scope of the present invention to bevel the leading edge of the pawl member to accomplish the same purpose, that is, to allow the pin to ride up over the end of the pawl member in one direction until the pin reaches a point where it coacts with the pawl member to prevent the pawl member from being moved in the reverse direction, until the pin is positively removed as a result of the action of the remainder of the bimetallic means.

Referring now to FIGS. 9 and 10, which illustrate a fifth preferred embodiment of the present invention designated generally 400, it may be seen that both the mounting member 402 and pawl member 404 of this embodiment comprise substantially flat bar-shaped pieces. The bimetal 422 is again suitably mounted on the mounting member 402 by screws 406 or other suitable fastening means, while in this embodiment thermal insulation 408 is disposed between the bimetal 422 and the mounting element to insulate the bimetal from the heat sink type of action which the mounting element 402 might otherwise exert on the bimetal 422 to prevent the rapid activation thereof. The track means of the embodiment of FIGS. 9 and 10 for limiting the path of sliding engagement between the members and for further maintaining the sliding engagement between the appropriate portions of the mounting and pawl members, comprises a slot 470 having a plurality of tracking bosses 472 and 474 disposed therein. In addition to establishing the tracking axis, these tracking bosses 472 and 474 establish the limits of the path of sliding engagement between the mounting and pawl members. In FIGS. 9 and 10, these members are disposed in the normal or restrained position and tracking boss 472 has come to rest to interfere with one end of slot 470. The actuated position of members 402 and 404 with respect to each other is defined by the interference between tracking boss 474 and the other end of slot 470. In this embodiment, the bearing surfaces of the mounting member comprise a flat surface portion of one end thereof, a portion of the outer surfaces of the tracking bosses 472 and 474 and the undersurface of the retaining heads 478 and 480 which act in cooperation with mounting member 402 to retain pawl member 404 therebetween. This embodiment, which may simply be constructed using screws milled into the configuration shown in FIGS. 9 and 10 is accordingly extremely inexpensive to construct yet, nonetheless, accomplishes many of the objects of the present invention.

Figure 12:
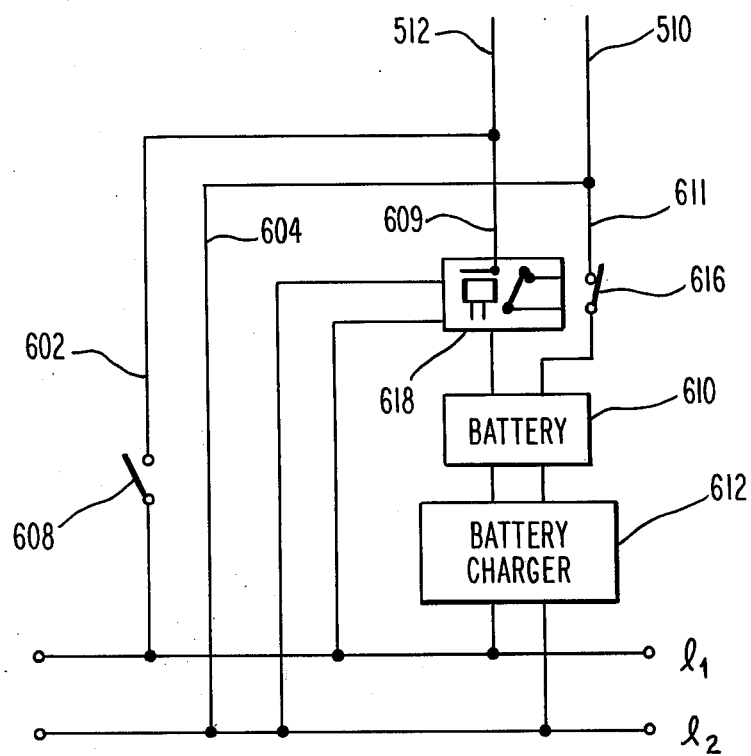
FIG. 12 is an electrical shcematic showing primary and secondary power sources connected to a heating pad on a bimetallic means.

Applicant's improved heat responsive releasing device, which is remotely activatable through an electric heating means and, further, automatically activatable in the event of a power failure of the primary power source feeding the heating means, is illustrated in FIGS. 11 and 12. FIG. 11 shows the bimetallic means 120 of FIG. 2 with serpentine bimetallic link 122, bimetal mounting place 104 and pin 124. The preferred embodiment heating means for heating the bimetallic means is the electric heating pad 500 shown located on the serpentine link 122 at a first curved portion 502 of the link on the concave surface. Straight portions 504 and 506 of the link are connected to the first curved portion at either end, and a portion of the pad 500 overlaps a portion of the surfaces of these straight portions. The heating pad could be located at any other part of the link to heat it and thereby activate it including just the curved portion. For other means of heating the bimetallic link 122, see FIG. 4 of U.S. Pat. No. 3,889,314.

The pad 500 comprises conducting wire of a predetermined resistance such that when electrical current is passed through the wires, heat is generated and passed to the bimetallic link which in turn heats up and the link becomes activated. The wires within the pad are not illustrated but the wire leads 510 and 512 are. These wires are connected to a source of electric current which allows the heating means to be remotely controlled. The preferred embodiment wire for use in the heating pad 500 comprises wire known in the art as nichrome wire.

FIG. 12 is a schematic illustration of the preferred embodiment circuit which powers the heating pad 500. The primary power source 600 is represented by the 120 volt conventional electrical services lines $1_1$ and $1_2$ furnished by electric utilities. This primary power source is connected to the heating pad leads 510 and 512 by wires 602 and 604. In FIG. 12, a portion of the wire leads 510 and 512 from heating pad 500 on bimetallic means 120 of FIG. 11 is illustrated. Switch 608 is shown positioned in wire 602 and it produces a means of turning the electrical current on or off to the heating pad 500. This switch can be remotely controlled to provide remote control activation of the heat releasing device. Here it is shown in the open position and the link 122 is therefore in its normal locked position.

Also connected to wires 510 and 512 by wires 609 and 611 is battery 610 which in turn is connected to battery charger 612 which in turn is connected across the primary power source, lines $1_1$ and $1_2$. Switch 616 is shown connected in wire 611 between battery 610 and wire 510 while relay 618 is connected in wire 601 between battery 610 and wire 512. This part of the circuit just described provides a secondary power means for automatically delivering electric current to the heating means when and if the primary power source (lines $1_1$ and $1_2$) fails.

The secondary power means comprises the secondary power source, battery 610 and battery charger 612, and secondary power activation means, relay 618, for automatically connecting the secondary power source to the heating means when the primary power source fails.

Under normal conditions, when the primary power source is functioning, it is not required that the battery be available for delivering electric current to the heating pad 500. To keep the battery out of the circuit to the heating means, relay 618 is utilized powered by primary power source $1_1$, $1_2$. When so powered, the relay acts to break the connection between battery 610 and line 512 in wire 609. As long as the primary power source is functioning, the battery 610 is not being utilized.

The preferred embodiment battery 610 is of the lead acid storage type. This type battery was chosen because of its large current capacity which is needed to supply electric current to the heating means to heat the link 122 for as long as may be required before primary power is restored.

If a lead acid storage battery is left inactive for a given length of time, it begins to lose its charge. To prevent this and to maintain the battery at its full capacity, a battery trickle charger 612 is provided powered by primary power source $1_1$, $1_2$. As long as there is no primary power failure, charger 612 maintains battery 610 at full capacity and relay 618, or any other device capable of providing the same function, keeps battery 610 out of the circuit to heating pad 500. However, in the event of primary power failure, battery charger 612 shuts down, relay 618 relaxes thereby completing the connection between battery 610 and line 512 through line 609, and the full capacity battery 610 delivers current to heating pad 500.

In addition to selecting a lead acid storage battery, applicant has chosen an absorbed electrolyte battery. This means there is no free liquid electrolyte (mainly sulfuric acid) in the battery since it is absorbed in the plates of the battery. Because of this, the battery can be used in any position which is an advantage in implementing the invention. Also, applicant prefers a hermetically sealed battery. The advantage of this is that there is no venting of gases such as hydrogen and oxygen to the atmosphere as is normally the case with lead acid batteries which are not sealed. Sealing eliminates the danger of explosions resulting from ignition of hydrogen.

Switch 616 which is normally closed can be used as a means of keeping the battery out of the circuit with the heating pad when the primary power source is shut down for routine servicing.

Normally, heating pad 500 is intended for use with 120 volt alternating current as conventionally supplied by public utilities. However, when battery 610 is used to supply current, heating pad 500 must be able to accept a 12 volt direct current source and still provide the necessary heat. To do this, for example, the resistance of the wire is chosen to insure that excessive current drain from the primary power source is avoided while at the same time insuring that sufficient power is delivered to the heating pad to activate the device in a reasonably short length of time. Once this resistance is determined, the size of the battery is chosen such that a predetermined percentage of the power delivered by the primary power source will be delivered by the battery, e.g. 50% or 100%.

It will be understood that various changes in the details, materials and arrangement of the parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:
1. A heat responsive releasing device, comprising:
 (a) a mounting member;
 (b) a pawl member slidably engaging said mounting member;
 (c) bimetallic means mounted on said mounting member for restraining said pawl member relative to said mounting member in response to a preselected normal ambient temperature and for releasing said pawl member in response to at least a preselected increase in said ambient temperature whereby said pawl member and said mounting member may then slide relative to each other;

(d) remotely controlled electric heating means located on said bimetallic means for heating said bimetallic means;

(e) primary power source for delivering electric current to said heating means; and (f) secondary power means for automatically delivering electric current to said heating means when said primary power source fails.

2. The invention of claim 1 wherein said heating means comprises an electrical heating pad.

3. The invention of claim 2 wherein said heating pad comprises nichrome wire.

4. The invention of claim 1 wherein said secondary power means comprises a secondary power source independent of said primary power source when said primary power source fails; and secondary power activation means for automatically connecting said secondary power source to said heating means for delivering electric current thereto when said primary power source fails.

5. The invention of claim 4 wherein said secondary power activation means comprises a relay.

6. The invention of claim 4 wherein said secondary power source is a secondary storage battery.

7. The invention of claim 6 wherein said secondary power means further comprises a battery trickle charger for maintaining said battery at full capacity when said battery is not in use.

8. The invention of claim 6 wherein said battery is hermetically sealed lead acid battery.

9. The invention of claim 6 wherein said battery is a lead acid, absorbed electrolyte battery.

10. A heat responsive releasing device, comprising:

(a) a mounting member;

(b) a pawl member which slidably engages said mounting member, and tracks relatively along said mounting member between at least restrained and activated positions defined along said mounting member;

(c) bimetallic means mounted on said mounting member for restraining said pawl member relative to said mounting member in response to a preselected normal ambient temperature and for releasing said pawl member in response to at least a preselected increase in said ambient temperature whereby said pawl member and said mounting member may then slide relative to each other, said bimetallic means comprising:

(i) a bimetal;

(ii) a latching means for at least receiving and engaging at least a portion of said pawl member when said pawl is moved relatively away from said actuated position into said restrained position and in response to at least said normal ambient temperature, said latching means comprising a pin attached to said bimetal; said pin having at least one beveled surface and said pawl having at least one recess to find therein adapted to receive said pin when said pawl is in the restraining position relative to said mounting member and said ambient temperature is said normal temperature;

(d) remotely controlled electric heating means located on said bimetal for heating said bimetal;

(e) primary power source for delivering electric current to said heating means; and (f) secondary power means for automatically delivering an electric current to said heating means when said primary power source fails.

* * * * *